Nov. 29, 1960 P. F. HAYNER 2,962,002
TWO-STAGE HYDRAULIC SERVO VALVE
Filed April 10, 1956 6 Sheets-Sheet 1

Paul F. Hayner
INVENTOR.

Fig. 2

CONTROL
PISTON-VALVE
DISPLACEMENT

P. F. HAYNER 2,962,002

TWO-STAGE HYDRAULIC SERVO VALVE

Filed April 10, 1956

Paul F. Hayner
INVENTOR.

Nov. 29, 1960 P. F. HAYNER 2,962,002
TWO-STAGE HYDRAULIC SERVO VALVE
Filed April 10, 1956 6 Sheets-Sheet 4

Paul F. Hayner
INVENTOR.

Nov. 29, 1960         P. F. HAYNER         2,962,002

TWO-STAGE HYDRAULIC SERVO VALVE

Filed April 10, 1956         6 Sheets-Sheet 6

Paul F. Hayner
*INVENTOR.*

United States Patent Office 2,962,002
Patented Nov. 29, 1960

2,962,002

TWO-STAGE HYDRAULIC SERVO VALVE

Paul F. Hayner, Nashua, N.H., assignor to Sanders Associates, Inc., Nashua, N.H., a corporation of Delaware Filed Apr. 10, 1956, Ser. No. 577,215

9 Claims. (Cl. 121—46.5)

The invention relates to hydraulic servo valves. More particularly, the invention relates to two-stage, electrohydraulic servo valves in which pilot valve means control the pressure of fluid in a variable pressure chamber to actuate a control valve.

In the prior art, a number of hydraulic servo valves utilize a pilot member whose position is changed to vary the opening, and, hence, the pressure of a variable pressure chamber to actuate a control valve. Such a valve is described in U.S. Patent 2,625,136 to W. C. Moog, Jr. These prior art valves are subject to certain well-known deficiencies which limit, for example, their linearity, sensitivity, hydraulic amplification, frequency response, stiffness, and are subject to variations in operating characteristics due to changes in supply pressure. Variations in system pressure greater than five percent (5%) cause prior art valves to produce intolerable null shifts. Such valves are rendered quite unstable while the system pressure is initially building up. This sensitivity to system pressure variation is particularly undesirable in the highly sensitive valves typical of modern servo practice. In these valves, the effect of a relatively small shift in system pressure is large compared to the small total input power characteristic of such valves.

In valves of the class being considered, a pilot member is positioned in opposition to a jet stream of fluid flowing through a nozzle in a variable pressure chamber. They thus require work to position the pilot member since it operates through a distance against a definite pressure and force, and is, therefore, further subjected to reaction forces.

It is therefore an object of the invention to provide an improved hydraulic servo valve having increased sensitivity and higher hydraulic amplification.

A further object of the invention is to provide an improved hydraulic servo valve having an increased frequency response.

A still further object of the invention is to provide an improved hydraulic servo valve, the operation of which is substantially independent of variations in supply pressure.

Another object of the invention is to provide an improved hydraulic servo valve relatively insensitive to spurious reaction forces.

Yet another object of the invention is to provide an improved hydraulic servo valve having a high degree of linearity of control.

In accordance with the invention there is provided an hydraulic servo valve comprising a valve body. A control valve, including a movable piston-valve, is disposed in the body and adapted selectively to control the passage of fluid under pressure therethrough. A variable pressure chamber is coupled to the piston-valve for controlling its motion by variations in pressure in the chamber. The chamber is adapted for connection to a source of fluid under pressure and has an orifice to enable fluid flow therethrough along a predetermined jet stream axis. Pilot valve means are provided within the body and exterior the chamber. The pilot valve means have a member adjacent to and movable across the orifice which is adapted to control the effective opening of the orifice by transverse motion relative to the direction of the jet stream whereby relatively small displacements of the pilot member relative the orifice cause the pressure in the chamber to vary and effect larger displacements of the piston-valve to control the flow of the fluid. Resilience means are provided for restrictively coupling the pilot valve member to the valve body whereby motion of the pilot valve member takes place in opposition to the force of the resilience means. In addition, degenerative feedback means are provided for coupling the movable piston valve and the pilot valve member. The feedback means restore the pilot valve member to an equilibrium position relative to the orifice in response to the displacement of the piston valve, whereby the maximum total displacement of the pilot valve member relative to the orifice is less than the maximum total displacement of the piston valve relative to the valve body.

For a better understanding of the present invention, together with other and further objects thereof, reference is made to the following description taken in connection with the accompanying drawings, and its scope will be pointed out in the appended claims.

Figure 1:
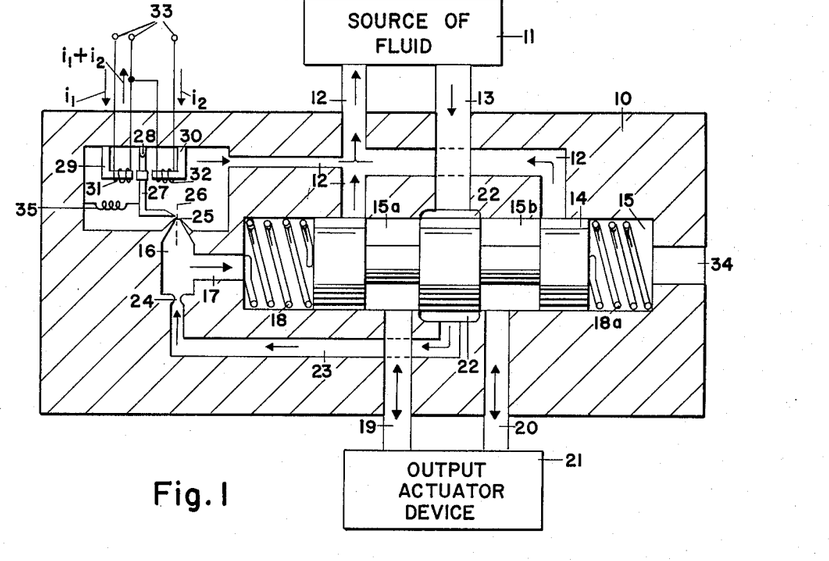
Fig. 1 is a partially schematic, sectional view of an electrohydraulic servo valve embodying the invention.

*Description and operation of the hydraulic servo valve in Fig. 1*

Referring now in more detail to the drawings and with particular reference to Fig. 1, there is here illustrated an hydraulic servo valve in neutral or no-signal condition. The servo valve includes a valve body 10, a control valve means, a variable pressure chamber coupled to the control valve, pilot valve means coupled to the variable pressure chamber and a motor affixed to the valve body 10. The valve is adapted for connection to a source 11 of fluid under pressure through conduits 12 and 13 which communicate with a control valve disposed in the valve body 10. The control valve includes a slidable control piston-valve 14 disposed in a control cylinder 15 formed in the valve body 10. The control valve couples fluid under pressure from the conduits 12 and 13 to a pair of output control passageways 19 and 20 coupled to an output actuator device 21. In the preferred embodiment the control valve is a conventional four-way spool valve; hence, the piston-valve 14 is undercut to provide three lands, as shown, and with the cylinder 15 a pair of control chambers 15a and 15b adjacent the central land. The control chambers are continuously connected to the output control passageways 19 and 20. An annular chamber 22 surrounds the central land of the piston-valve and communicates with a passageway 23 as further described below. In the neutral condition illustrated, the piston-valve 14 is centrally positioned by a pair of biasing springs 18 and 18a to occlude the conduits 12 and 13.

A variable pressure chamber 16, formed in the valve body, is hydraulically coupled to an end of the piston-valve 14 through a passageway 17. The chamber 16 is connected to the source 11 through a constriction 24, passageway 23, the chamber 22 and the conduit 13. As shown more particularly in Fig. 1a, a nozzle or restricted orifice 25 is formed in an end of the chamber 16 to enable fluid flow therethrough along a predetermined jet stream axis 26. The chamber 16 is coupled from the orifice 25 through an adjacent pilot valve chamber and a branch of the return conduit 12 to the source 11.

The pilot valve means are disposed within the valve body exterior the chamber 16, and include a pilot member or cantilever 27 adjacent the orifice 25. The lever 27 is pivotally affixed to the valve body by means of a pivot 28 and is adapted, as shown, to control the effective opening of the orifice 25 by transverse motion relative to the axis 26 of the jet stream of fluid emanating from the chamber 16. A pilot biasing spring 35, providing both expansion and compression bias, positions the lever 27 in its equilibrium, no-signal, position.

An electromagnetic force motor is affixed to the valve body and positions the pilot lever 27 relative the orifice 25. The motor comprises a pair of ferromagnetic cores 29 and 30 about which a pair of windings 31 and 32 are mounted. The windings are connected in series for connection, for example, to a push-pull source of input signal through three terminals 33. It will be apparent that the lever 27 is also the armature for the motor and is, therefore, preferably formed, at least in part, of ferromagnetic material.

Operation

Figures 1A, 1B:
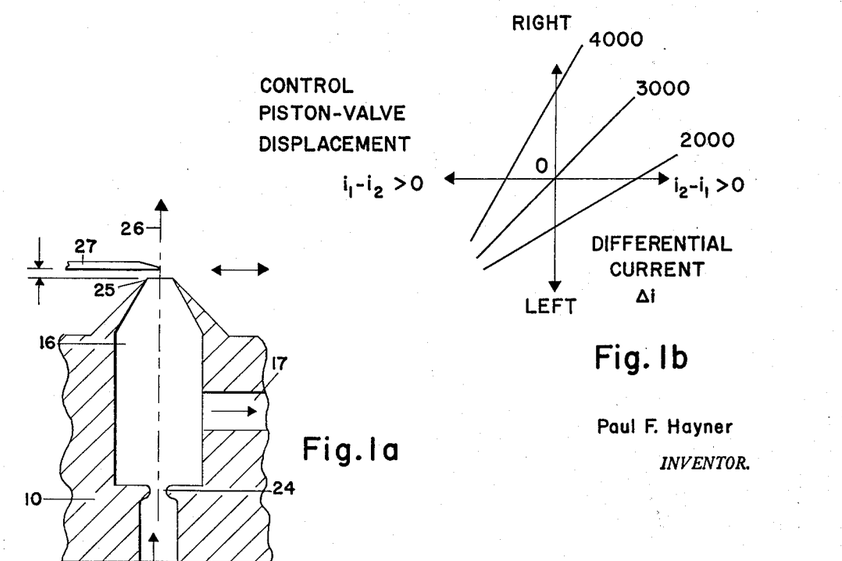
Fig. 1a is an enlarged detail view of a portion of the valve.
Fig. 1b is a graph illustrating an aspect of this operation.

Considering now the operation of the servo valve just described, and referring to Figs. 1, 1a and 1b, the valve as illustrated is in an equilibrium condition. The currents $i_1$ and $i_2$ in the windings 31 and 32, respectively, are then equal and opposite. The magnetic flux thus produced provides magnetomotive forces operating on the lever 27 that are similarly equal and opposite. The differential current $\Delta i = i_1 - i_2 = 0$ and hence, the differential magnetomotive force $\Delta \phi$ is likewise zero. At this time, the lever 27 is positioned so as to half-way occlude the orifice 25 as shown in Fig. 1a.

Upon the application of a signal to the motor producing a differential current $\Delta i$, the lever 27 is displaced from its central position relative the orifice 25 in opposition to the expansion or compression of the spring 35. The pressure in the chamber 16 increases or decreases to displace the piston-valve 14 accordingly to the right or left. The return conduit 12 and the pressure conduit 13 are then directly coupled through the control chambers 15a and 15b to the output control passageways 19 and 20.

Thus, if the differential current $\Delta i = i_2 - i_1 > 0$, the lever 27 is positioned to the right, the orifice 25 further occluded and the pressure in the chamber 16 increased. The increased pressure is transmitted through the passageway 17 to an end of the piston valve 14. The valve 14 is displaced to the right and the conduit 13 is connected through the control chamber 15a to the passageway 19, while the branch conduit 12 is connected through the chamber 15b to the passageway 20. Conversely, when the signal is such that the differential current $\Delta i = i_1 - i_2 > 0$, the lever 27 is positioned to the left to produce a reversal of differential pressure across the output actuator 21. Since no internal feedback is incorporated in this valve, the motion of the piston valve 14 continues until it reaches an extreme position or the input signal is cancelled by external circuitry.

Referring now to Fig. 1b there is here presented a graph of control piston valve displacement as a function of input differential current equal to the algebraic difference between the two currents $i_1$ and $i_2$. The graphs are taken for three different pressure conditions of the hydraulic fluid from source 11, 2000, 3000 and 4000 pounds to illustrate the effect of a variation in system pressure on the operation of the valve. It will be seen that the central position of the control piston-valve 14 and its rate of displacement relative to $\Delta i$ vary with variations in system pressure. Thus, at 2000 pounds, when $\Delta i = 0$, the central position of the piston-valve 14 is displaced to the right and its rate of change of displacement is decreased; at 3000 pounds an intermediate rate of displacement is achieved and $\Delta i = 0$ coincides with the central position of the piston-valve 14; and, at 4000 pounds the central position of the piston-valve 14 is to the left of $\Delta i = 0$ and the rate of displacement is sharply increased. The shift in the null or central position of the piston-valve 14 relative the differential current $\Delta i$ occurs because the bias pressure provided by the bias springs 18 and 18a remains constant and cannot compensate for variations in system pressure.

It is to be noted, however, that even for the relatively simple valve illustrated in Fig. 1 a very definite advantage accrues in that only a small signal amplitude is required to position the lever 27 relative the orifice 25. This advantage is realized because the motion of that part of the lever 27, which defines the effective opening of the orifice 25, moves in a direction orthogonal to that of the axis 26 of the jet stream of the fluid flowing from the chamber 16.

It will be seen that if the lever 27 were infinitely thin no work would be done in controlling the opening at the orifice 25. Reaction forces introduced by virtue of the pressure change in the chamber 16 are normal to the direction of motion of the orifice-opening-controlling end of the lever 27. These forces are directly transmitted through the lever 27 to the valve body 10 and produce a negligible effect on the operation of the positioning of the lever 27. By way of comparison, in the prior art, a pilot member analogous to the lever 27 is positioned in opposition to the pressure of the fluid in the chamber 16. The motion of such a prior art pilot member is axial relative to the axis of the jet stream as opposed to the orthogonal motion of the lever 27 in the present invention. Thus, where the position of the prior art pilot member is dependent upon both the fluid pressure in the chamber 16 and the reaction forces produced by variations in pressure, the operation of the pilot lever 27 in the present invention is independent of both.

Figure 2:
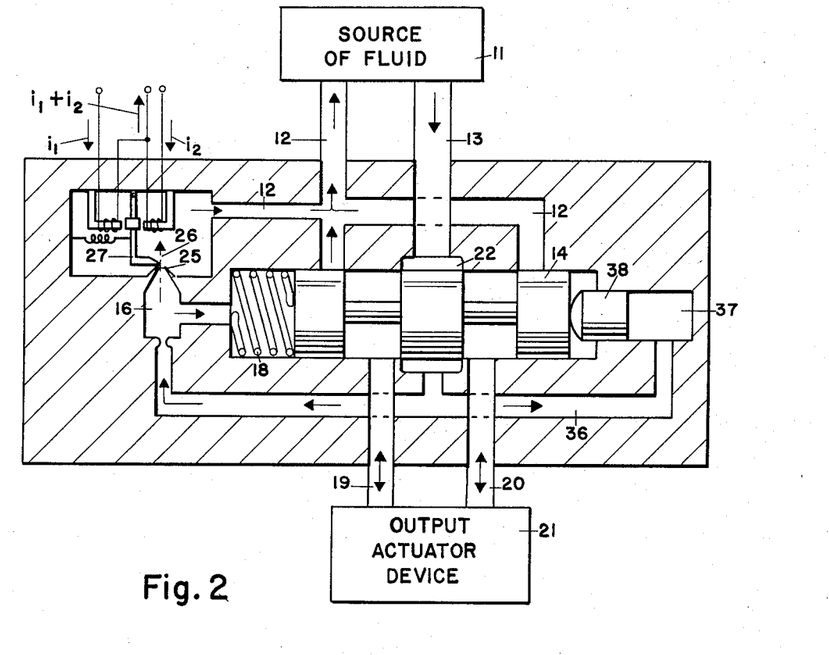
Fig. 2 is a partially schematic, sectional view of a modification of the embodiment of the valve in Fig. 1, incorporating a constant pressure bias chamber.

Description and operation of the hydraulic servo valve in Fig. 2

Referring now to Fig. 2, a modification of the valve in Fig. 1 is here presented in which a constant pressure bias chamber is substituted for the bias spring 18a. Since the valve as shown in Fig. 2 is otherwise similar to that of Fig. 1, corresponding elements are indicated by identical reference numerals. A conduit 36 connects fluid under pressure from the annular chamber 22 to a constant pressure bias chamber 37. The bias chamber 37 provides a bias force acting through a movable annular member 38 to the right end or face of the piston-valve 14.

Operation

When a constant pressure bias chamber is introduced in place of a bias spring in opposition to the motion of the piston-valve 14, an extraordinary result is achieved; the central position of the piston-valve 14 coincides with $\Delta i=0$ regardless of variations in system pressure. As noted above, the position of the lever 27 relative the orifice 25 is independent of the pressure in the chamber 16 and is a function only of the differential current $\Delta i$.

Figure 2A:
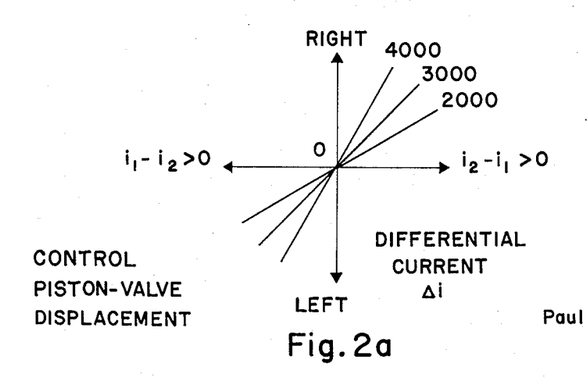
Fig. 2a is a graph illustrating a characteristic of its operation.

In the embodiment of Fig. 2 the spring constant of the spring 18 is so chosen that the primary positioning force for the piston-valve 14 is provided by the differential force produced by the fluid pressures in the chambers 16 and 37. Since force equals pressure times area, this further implies that the motion of the piston 14 is dependent only upon the ratio of effective surface areas at its opposite ends. It is independent of absolute pressure and, therefore, of system pressure variations. If, for example, the area of the right face of the member 38 is one-half that of the left face of the left land of the piston 14, only half system pressure is required at the left face to balance full pressure from the right. As indicated in Fig. 2a the rate of displacement of the piston 14 increases with system pressure but its central position coincides with $\Delta i=0$ for all system pressure variations.

The combination of the pilot valve means with a constant pressure bias chamber acting on a control piston-valve as taught herein provides a degree of null stability heretofore unknown without the addition of a much more complex structure.

Figure 3:
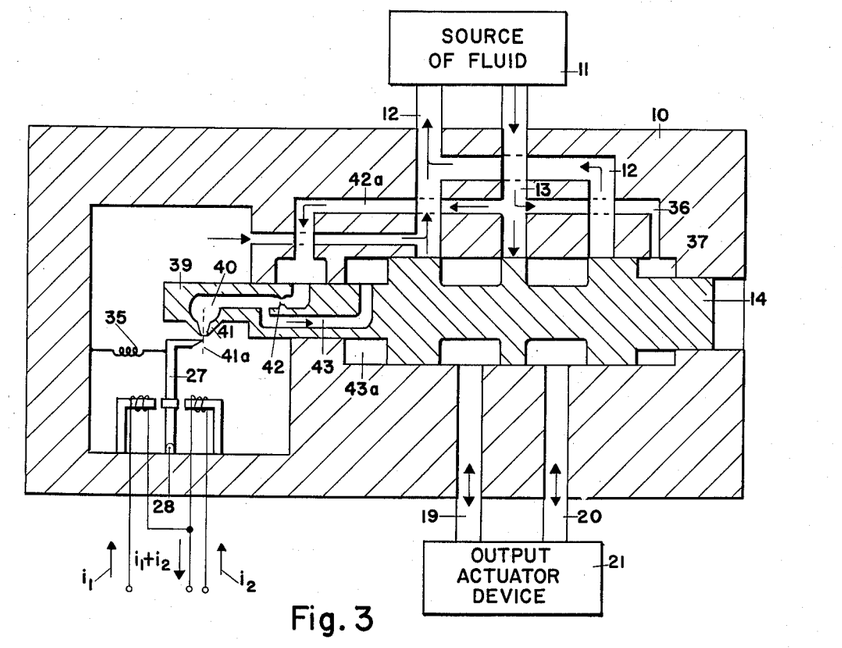
Fig. 3 is a partially schematic, sectional view of a further modification of the embodiment in Fig. 1 incorporating a variable pressure chamber affixed to a control piston-valve.

Description and operation of the hydraulic servo valve in Fig. 3

In the embodiment of Fig. 3 an element of feedback is introduced by providing a variable pressure chamber in the piston-valve 14. The hydraulic servo valve as shown in Fig. 3 is generally similar to that of Fig. 2; hence, corresponding elements are indicated by identical reference numerals.

An extension 39 is attached to the piston-valve 14 in which a variable pressure chamber 40 is formed. The chamber has an orifice or nozzle 41 adjacent the pilot lever 27 and is controlled by it. The chamber is connected through a constriction 42 to a conduit 42a directly connected to the source 11. A further passageway 43 couples the chamber 40 to the left face of the left-hand of the piston-valve 14. Next to the right face of the right land of the piston-valve 14 is a constant pressure bias chamber 37 which is connected through the passageway 36 to the conduit 13 to the source of fluid under pressure.

Operation

Figure 3A:
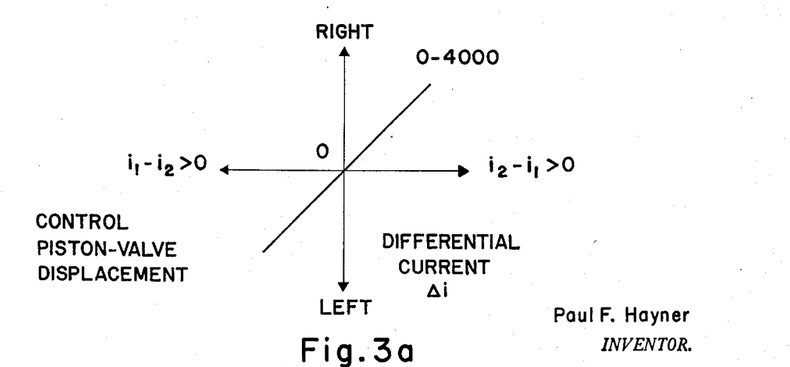
Fig. 3a is a graph illustrating a characteristic of its operation.

Considering now the operation of the hydraulic valve just described, and referring to Figs. 3 and 3a, assume the lever 27 to be positioned to the right by virtue of an input differential current $\Delta i$ produced by an input signal such that $i_2-i_1>0$. Then the pressure in the chamber 40 is increased and applied through the passageway 43 to the piston-valve 14. The piston 14 moves to the right relative to the valve body 10 until the lever 27 is restored to its central position relative the orifice 41 and the pressure in the chamber 43a equals that of the chamber 37. As described above, motion of the piston-valve 14 to the right causes fluid under pressure to be applied from the source 11 through the pressure conduit 13 to the output control passageway 19 and the actuator device 21; fluid then returns through the control passageway 20 and return conduit 12 to the source 11.

It is to be noted, however, that the displacement of the piston 14 relative to its zero position is independent of variations of supply pressure. The piston-valve 14 nulls about the position of the lever 27 relative the orifice 41.

Hence, under dynamic conditions the piston-valve 14 can never travel farther than the lever 27. Since the motion of the lever 27 is assumed to be linear relative to the differential current $\Delta i$, the motion of the control piston is linear relative to the differential current $\Delta i$. For these reasons zero differential current coincides with the central position of the piston-valve 14 for all variations of system pressure.

As shown in Fig. 3a, the graph illustrates the constant null and rate of displacement of the piston-valve 14 relative the differential current $\Delta i$ in response to variations in system pressure. The rate of displacement of the piston-valve 14 does vary relative to time with variations in system pressure. This, however, does not affect the linearity of displacement of the piston 14 relative the differential current $\Delta i$.

Figure 4:
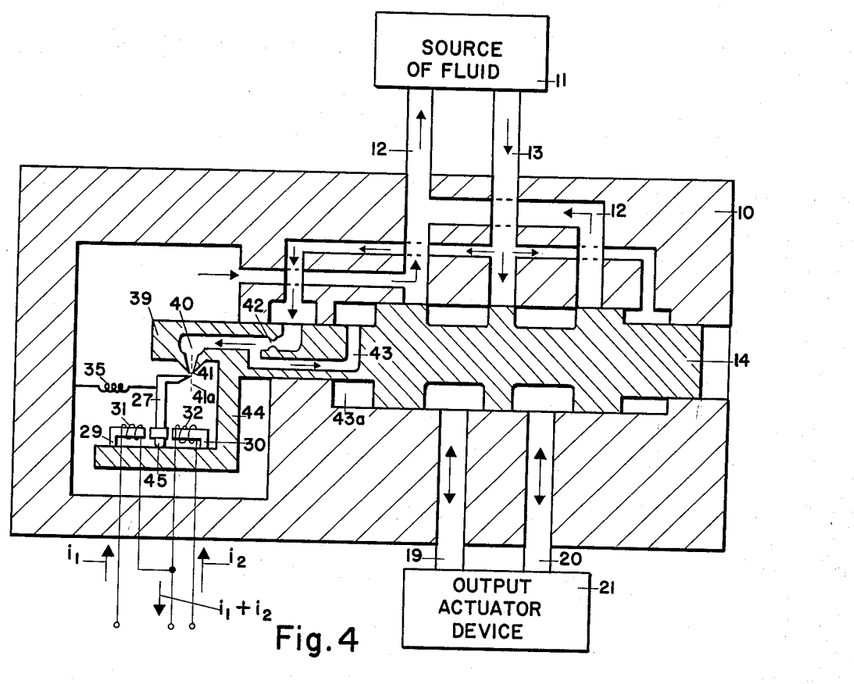
Fig. 4 is a partially schematic, sectional view of a still further modification of the embodiment in Fig. 1 incorporating a force motor and pilot valve member affixed to a control piston-valve.

Description and operation of the hydraulic servo valve in Fig. 4

Referring now to Fig. 4, there is here illustrated a modification of the hydraulic servo valve in Fig. 1 and, more particularly, a modification of the valve as illustrated in Fig. 3, in which the motor and the pilot lever are affixed to the piston-valve 14. The valve as shown in Fig. 4 is otherwise generally similar to that of Fig. 3; hence, corresponding elements are indicated by identical reference numerals. Here an added extension 44 is affixed to the extension 39 of piston-valve 14. The motor cores 29 and 30 are mounted on the extension 44 as well as the lever 27 which is here pivotally connected to a pivot 45 affixed to the extension 44. A resilience means is provided between lever 27 and housing 10 in the form of biasing spring 35, as shown.

Operation

Figure 4A:
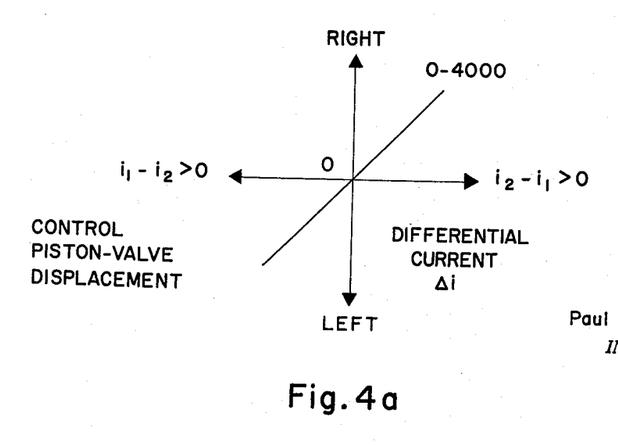
Fig. 4a is a graph illustrating a characteristic of its operation.

Considering now the operation of the electro-hydraulic servo valve just described and referring to Figs. 4 and 4a, and assuming a differential current $\Delta i$ such that $i_2-i_1>0$, the piston-valve 14 is directed to the right.

A positive differential current in the windings 31 and 32 causes the lever 27 to be positioned to the right in opposition to the biasing spring 35 to the valve body 10. The pressure in the chamber 40 is increased and is transmitted through the passageway 43 to the chamber 43a to displace the piston-valve 14 to the right. The piston-valve 14 continues to move to the right until the force of the spring 35 overcomes the strength of the current in the coils 31 and 32 to reposition the lever 27 at its central position. It is to be noted here that the distance that the lever 27 must travel is limited to the incremental control required by, for example, maximally occluding the orifice 41 or completely opening it. The motion of the lever 27 need not be linear since the position of the piston-valve 14 is not determined by the rate at which the lever changes, but rather the length of time that the lever 27 relative to the orifice 41 is off the equilibrium position. It will be apparent, then, that the position of the piston-valve 14 is primarily determined by the differential current $\Delta i$ and is independent of variations in system pressure.

Here again, negligible work is required for the lever 27 to move transversely to the axis 41a of the jet stream flowing through the nozzle 41. Since the motor, lever and variable pressure chamber are affixed to the piston-valve 14, the motor is required to supply only that force necessary to differentially position the lever 27 and is not required to position the lever 27 for the full length of travel of the piston-valve 14 as is the case, for example, in the servo valve of Fig. 3. Variation in system pressure, while not affecting the displacement of the piston-valve 14 as a function of the differential current, does affect the transient rate of response. More particularly, an increase in system pressure increases the rate at which the piston-valve 14 finds its proper position. This results from the fact that the differential pressure operating across the piston-valve 14 is accordingly increased. However, as indicated in the graph in Fig. 4a, the linearity of the displacement of the piston-valve 14 relative to the differential current Δi is independent of extremely wide variations in system pressure.

The lever 27 moves in opposition to the restraining force of the spring 35. The result of the motion of the piston valve 14 carries the lever 27 with it until the restraining force of the spring 35 overcomes the force of the motor acting on the lever 27. For example, if the piston valve 14 were moving to the right, further motion of the piston valve tends to increase the space between the lever 27 and the nozzle 41 of the pressure chamber 40, tending to stop the valve 14 and restore static equilibrium. The valve 14 remains open until the control signal is changed. As, for example, by feedback from the control device 21. The servo valve of the present invention, therefore, has inherent degenerative feedback.

Figure 5:
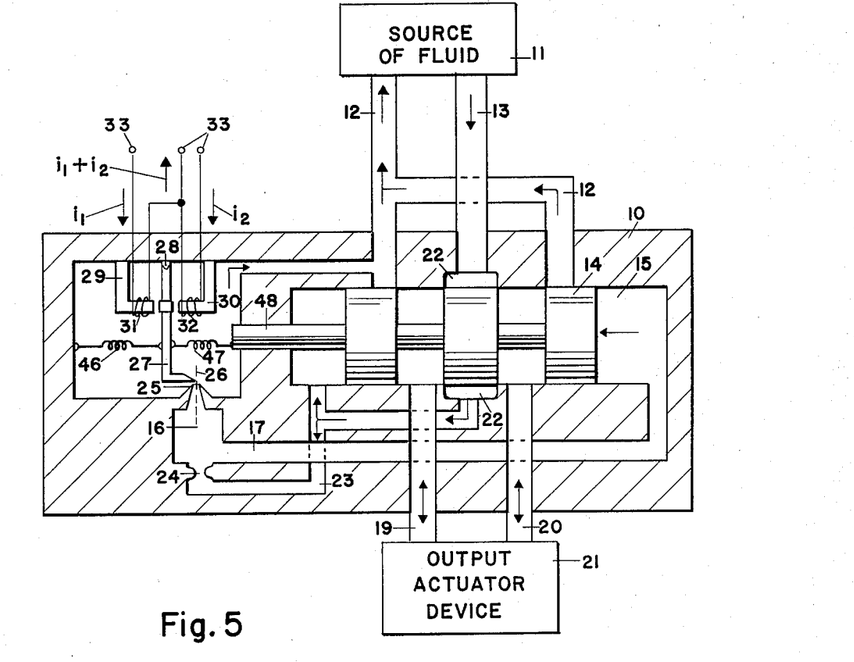
Fig. 5 is a partially schematic, sectional view of another modification of the embodiment in Fig. 1 incorporating a resilience means to couple a pilot valve member and control piston-valve.

*Description and operation of the hydraulic servo valve in Fig. 5*

Referring now to Fig. 5, there is here illustrated an electro-hydraulic servo valve which incorporates a further modification of the valve as shown in Figs. 1 and 2. Since the valve that is shown in Fig. 5 is similar to that of Figs. 1 and 2, corresponding elements are indicated by identical reference numerals. Here the motor and pilot lever are affixed to the valve body 10 as well as the variable pressure chamber 16. A resilience means 47, a compression spring, mechanically couples the pilot lever 27 and the control piston-valve 14. A centering spring 46 is connected between the lever 27 and the valve body 10.

The variable pressure chamber 16 is coupled to the right end of the piston-valve 14 as shown. A constant pressure bias chamber is connected directly to the source 11 through a passageway 23, the annular chamber surrounding the center land of the piston-valve 14, and the conduit 13. An extension 48 of the piston-valve 14 is directly connected to the resilience means 47.

*Operation*

Figure 5A:
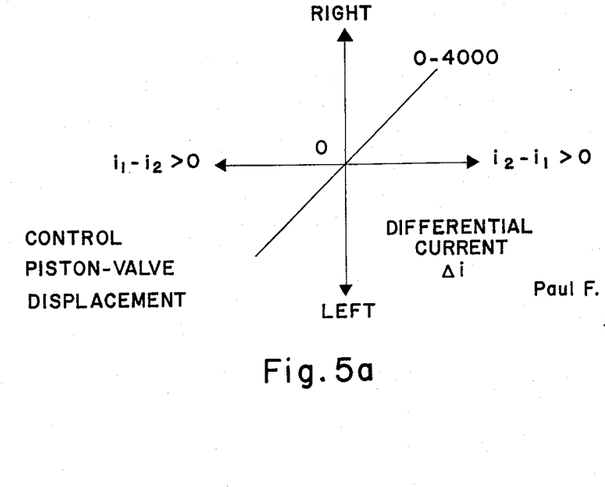
Fig. 5a is a graph illustrating a characteristic of its operation.

Considering now the operation of the hydraulic servo valve just described and referring to Figs. 5 and 5a, a differential current Δi such that $i_2 - i_1 > 0$ will again be assumed. The motor positions the lever 27 to the right in opposition to the force of the spring 47. The opening of the orifice 25 in the chamber 16 is then restricted, causing the pressure in the chamber 16 to increase and transmit an increased pressure through the passageway 17 to the right face of the right hand land of the piston-valve 14. The piston-valve 14 moves to the left to connect fluid under pressure to the output control passageway 20 and return fluid to the output control passageway 19. It will be seen that motion of the lever 27 in a given direction effects a displacement of the piston-valve 14 in the opposite direction. The piston-valve 14, assuming the lever to have been positioned to the right, is displaced to the left and continues to travel in opposition to the spring 47 until the lever 27 is restored to its equilibrium, or null position, relative the orifice 25. The displacement of the control piston-valve is again a function primarily of the input differential current Δi and is substantially independent of the degree of displacement of the lever 27. The graph of displacement of the piston 14 relative differential current Δi is shown in Fig. 5a.

Figure 6:
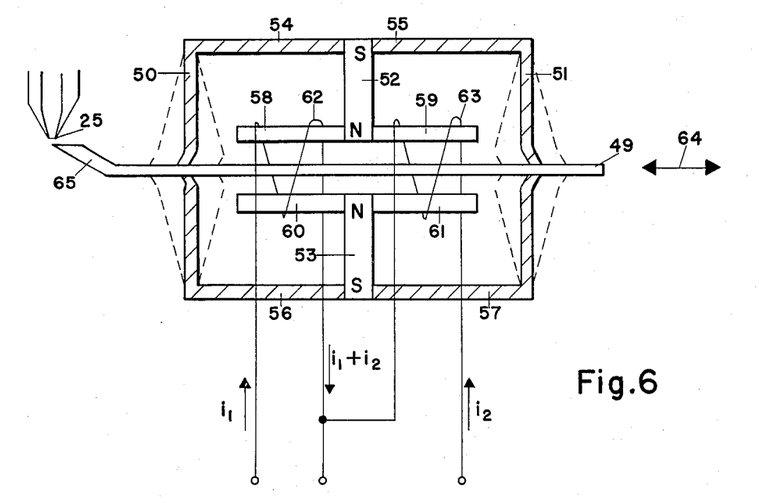
Fig. 6 is a partially schematic, sectional detail view of a modification of the motor and pilot valve member represented in Fig. 1.
Figure 7:
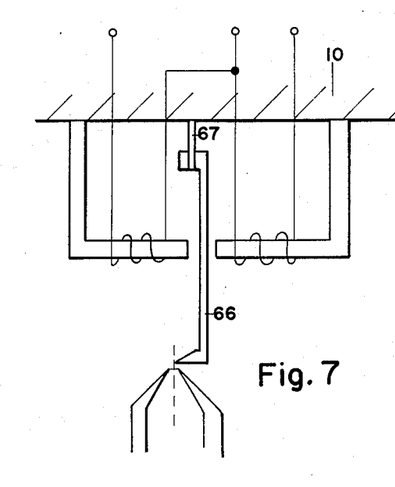
Fig. 7 is a partially schematic, sectional detail view of another modification of the motor and pilot valve member represented in Fig. 1.
Figure 8:
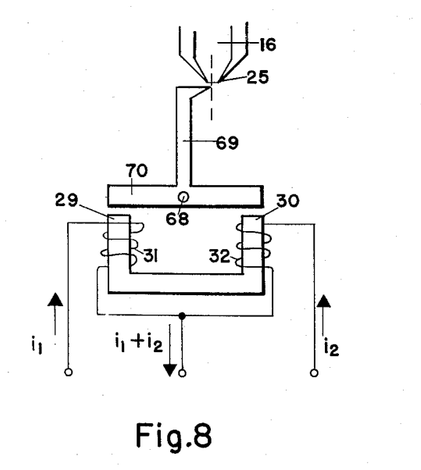
Fig. 8 is a partially schematic, sectional detail view of still another modification of the motor and pilot valve member represented in Fig. 1.

*Description and operation of the motors in Figs. 6, 7 and 8*

Referring now to Fig. 6, the pilot member corresponding to the lever 27 in Fig. 1 is a shaft 49 supported in place by a pair of ferromagnetic diaphragms 50 and 51. The shaft has a tapered end 65 adjacent the orifice 25 of a variable pressure chamber. A pair of biasing magnets 52 and 53 are positioned with their poles in opposition, as shown, to provide a biasing flux. Ferromagnetic core pieces 54–57, inclusive, are connected, as shown, between the diaphragms 50 and 51. Ferromagnetic core pieces 58–61, inclusive, are also affixed to the permanent magnets 52 and 53, and carry a pair of windings 62 and 63 which are connected in series. Motion of the member 49 is axial, as indicated at 64, in accordance with the differential current Δi in the windings 62 and 63. The member 49 has a tapered member 65 which is positioned relative to the nozzle 25, shown fragmentary, in accordance with an input differential current Δi.

When the core pieces 54–57 are, for example, affixed to the valve body, the diaphragms 50 and 51 are displaced to the left and the right as indicated by the dashed lines with respect to the valve body. Upon the application of a signal providing a differential current Δi such that the winding 63 produces a stronger flux than the winding 62, diaphragm 51 is attracted toward the core pieces 59 and 61 and, correspondingly, away from the core pieces 58 and 60.

Referring now to Fig. 8, another motor is shown. A lever 69 is rotated about a pivot 68 affixed, for example, to the valve body 10. A perpendicular bar 70 is affixed to the pivot 68 and lever 69. The bar 70 is normally maintained equidistant from the cores 29 and 30 by opposing magnetomotive forces produced by currents $i_1$ and $i_2$ in the windings 31 and 32, respectively. A differential current Δi such that $i_1 - i_2 > 0$ causes the bar 70 to rotate clockwise and position the lever 69 to the right to further occlude the orifice 25.

It will be apparent that the present invention provides an important step forward in the art of hydraulic control. The use of a pilot member in accordance with the principles of this invention to control the pressure of fluid in the variable pressure chamber by directing the pilot member transverse to the axis of a jet stream of fluid through an orifice in the chamber is indeed a unique and significant contribution. The principles of the invention, as disclosed herein, have broad application to a wide variety of hydraulic servo devices.

The present invention contributes substantially to reduction in complexity and expense of hydraulic servo valves. Thus, a valve as shown in Fig. 5 operates with a motor 0.2 ounce in weight as compared with 1.0 ounce for the smallest motors used in prior art valves. Similarly, this valve operates with an input power of only 0.001 watt as compared with 0.1 watt for prior valves to produce the same output power. The size of the orifice 25 need be only .006 inch as compared with a diameter of .030 inch in the prior art for the same degree of pressure variation.

The frequency response of servo valves is limited by the mass of a movable pilot valve member. The mass of the lever 27 in the present invention need be only .001 gram as compared to 1 gram for such members in the prior art. In the instant valve, this decreased mass also contributes to greater sensitivity as well as greatly enhanced frequency response.

The freedom for noise, for example, due to spurious forces produced by turbulence of the fluid within the valve, is an advantage provided by valves embodying this invention that is unknown in the prior art.

While there have been described what are at present considered to be the preferred embodiments of this invention, it will be obvious to those skilled in the art that various changes and modifications may be made therein without departing from the invention, and, it is, therefore, aimed in the appended claims to cover all such changes and modifications as fall within the true spirit and scope of the invention.

What is claimed is:

1. A hydraulic servo valve, comprising: a valve body; a control valve, including a movable piston-valve, disposed in said body and adapted selectively to control the passage of fluid under pressure therethrough; a variable pressure chamber coupled to said piston-valve for controlling the motion of said piston-valve by variations in pressure therein and adapted for connection to a source of fluid under pressure, said chamber having an orifice to enable fluid flow therethrough along a predetermined jet stream axis; a constant pressure bias chamber adapted to couple said fluid under pressure to the other end of said piston-valve; pilot valve means within said body and exterior said chamber and having a lever pivotally affixed to said body and disposed adjacent to and movable across said orifice, said lever adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid; electromagnetic motor means affixed to said body for positioning said pilot lever relative said orifice; and resilient means coupling said pilot lever and said piston-valve.

2. A hydraulic servo valve, comprising: a valve body; a control valve, including a movable piston-valve, disposed in said body and adapted selectively to control the passage of fluid under pressure therethrough; a variable pressure chamber hydraulically coupled to an end of said piston-valve for controlling the motion of said piston-valve by variations in pressure therein and adapted for connection to a source of fluid under pressure, said chamber having an orifice to enable fluid flow therethrough along a predetermined jet stream axis; pilot valve means within said body and exterior said chamber and having a member adjacent to and movable across said orifice, adapted to control the effective opening of said orifice by transverse motion relative to the direction of said jet stream whereby relatively small displacements of said member relative said orifice cause the pressure in said chamber to vary and effect larger displacements of said piston-valve to control the flow of said fluid; and motor means affixed to said piston-valve for positioning said pilot member relative said orifice.

3. A hydraulic servo valve, comprising: a valve body; a control valve, including a movable piston-valve, disposed in said body and adapted selectively to control the passage of fluid under pressure therethrough; a variable pressure chamber hydraulically coupled to an end of said piston-valve for controlling the motion of said piston-valve by variations in pressure therein and adapted for connections to a source of fluid under pressure, said chamber having an orifice to enable fluid flow therethrough along a predetermined jet stream axis; pilot valve means within said body and exterior said chamber and having a member adjacent to and movable across said orifice, adapted to control the effective opening of said orifice by transverse motion relative to the direction of said jet stream whereby relatively small displacements of said member relative said orifice cause the pressure in said chamber to vary and effect larger displacements of said piston-valve to control the flow of said fluid; and resilience means coupling said pilot member and said picton-valve.

4. A hydraulic servo valve, comprising: a valve body; a control valve, including a movable piston-valve, disposed in said body and adapted selectively to control the passage of fluid under pressure therethrough; a variable pressure chamber hydraulically coupled to an end of said piston-valve for controlling the motion of said piston-valve by variations in pressure therein and adapted for connection to a source of fluid under pressure, said chamber having an orifice to enable fluid flow therethrough along a predetermined jet stream axis; and pilot valve means within said body and exterior said chamber and having a lever pivotally affixed to said piston-valve and disposed adjacent to and movable across said orifice, said lever adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid.

5. A hydraulic servo valve, comprising: a valve body; a control valve, including a movable piston-valve, disposed in said body and adapted selectively to control the passage of fluid under pressure therethrough; a variable pressure chamber hydraulically coupled to an end of said piston-valve for controlling the motion of said piston-valve by variations in pressure therein and adapted for connection to a source of fluid under pressure, said chamber having an orifice to enable fluid flow therethrough along a predetermined jet stream axis; pilot valve means within said body and exterior said chamber and having a lever pivotally affixed to said body and disposed adjacent to and movable across said orifice, said lever adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid; and motor means affixed to said piston-valve for positioning said pilot lever relative said orifice.

6. A hydraulic servo valve, comprising: a valve body; a control valve, including a movable piston-valve, disposed in said body and adapted selectively to control the passage of fluid under pressure therethrough; a variable pressure chamber hydraulically coupled to an end of said piston-valve for controlling the motion of said piston-valve by variations in pressure therein and adapted for connection to a source of fluid under pressure, said chamber having an orifice to enable fluid flow therethrough along a predetermined jet stream axis; pilot valve means within said body and exterior said chamber and having a lever pivotally affixed to said piston-valve and disposed adjacent to and movable across said orifice, said lever adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid; and motor means affixed to said piston-valve for positioning said pilot lever relative said orifice.

7. A hydraulic servo valve, comprising: a valve body; a control valve, including a movable piston-valve, disposed in said body and adapted selectively to control the passage of fluid under pressure therethrough; a variable pressure chamber affixed to an end of and carried by said piston-valve for controlling the motion of said piston-valve by variations in pressure therein and adapted for connection to a source of fluid under pressure, said chamber having an orifice to enable fluid flow therethrough along a predetermined jet stream axis; a constant pressure bias chamber adapted to couple said fluid under pressure to the other end of said piston-valve; pilot valve means within said body and exterior said chamber and having a lever pivotally affixed to said piston valve and disposed adjacent to and movable across said orifice, said lever adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid; and electromagnetic motor means affixed to said piston-valve for positioning said pilot lever relative said orifice.

8. A hydraulic servo valve, comprising: a valve body; a control valve, including a movable piston-valve, disposed in said body and adapted selectively to control the passage of fluid under pressure therethrough; a variable pressure chamber hydraulically coupled to an end of said piston-valve for controlling the motion of said piston-valve by variations in pressure therein and adapted for connection to a source of fluid under pressure, said chamber having an orifice to enable fluid flow therethrough along a predetermined jet stream axis; pilot valve means within said body and exterior said chamber and having a lever pivotally affixed to said body and disposed adjacent to and movable across said orifice, said lever adapted to control the effective opening of said orifice by transverse motion relative to the direction of said jet stream whereby relatively small displacements of said lever relative said orifice cause the pressure in said chamber to vary and effect larger displacements of said piston-valve to control the flow of said fluid; motor means affixed to said body for positioning said pilot lever relative said orifice; and resilience means coupling said pilot lever and said piston-valve.

9. A hydraulic servo valve, comprising: a valve body; a control valve, including a movable piston-valve, disposed in said body and adapted selectively to control the passage of fluid under pressure therethrough; a variable pressure chamber coupled to said piston-valve for controlling the motion of said piston-valve by variations in pressure therein and adapted for connection to a source of fluid under pressure, said chamber having an orifice to enable fluid flow therethrough along a predetermined jet stream axis; pilot valve means within said body and exterior said chamber and having a member adjacent to and movable across said orfice, said member adapted to control the effective opening of said orifice by transverse motion relative to the direction of said jet stream whereby relatively small displacements of said member relative said orifice cause the pressure in said chamber to vary and effect larger displacements of said piston-valve to control the flow of said fluid; resilience means restrictively coupling said pilot valve member to said valve body whereby motion of said pilot valve member takes place in opposition to the force of said resilience means; and degenerative feedback means coupling said movable piston-valve and said pilot valve member for restoring said pilot valve member to an equilibrium position relative to said orifice in response to the displacement of said piston-valve, the maximum total displacement of said pilot valve member relative to said orifice being less than the maximum total displacement of said piston-valve relative to said valve body.

References Cited in the file of this patent
UNITED STATES PATENTS

| | | |
|---|---|---|
| 1,718,673 | Wettstein | June 25, 1929 |
| 2,520,115 | Cahill | Aug. 29, 1950 |
| 2,526,709 | Tait | Oct. 24, 1950 |
| 2,601,207 | Jacques | June 17, 1952 |
| 2,615,466 | Garde | Oct. 28, 1952 |
| 2,738,772 | Richter | Mar. 20, 1956 |
| 2,767,689 | Moog | Oct. 23, 1956 |
| 2,797,666 | Chubbuck | July 2, 1957 |

FOREIGN PATENTS

| | | |
|---|---|---|
| 525,878 | Germany | June 4, 1931 |
| 372,258 | Great Britain | May 5, 1932 |
| 874,370 | France | May 4, 1942 |